(12) United States Patent
Ringhand

(10) Patent No.: US 9,863,050 B2
(45) Date of Patent: Jan. 9, 2018

(54) CATHODE PLATE EDGE PROTECTOR AND METHODS OF MANUFACTURE

(71) Applicant: Clim-A-Tech Industries, Inc., Hopkins, MN (US)

(72) Inventor: Scott Ringhand, Eden Prairie, MN (US)

(73) Assignee: CLIM-A-TECH INDUSTRIES, INC., Hopkins, MN (US)

( * ) Notice: Subject to any disclaimer, the term of this patent is extended or adjusted under 35 U.S.C. 154(b) by 117 days.

(21) Appl. No.: 14/482,822

(22) Filed: Sep. 10, 2014

(65) Prior Publication Data

US 2014/0374247 A1 Dec. 25, 2014

Related U.S. Application Data

(63) Continuation-in-part of application No. 13/838,907, filed on Mar. 15, 2013, now Pat. No. 9,139,922.

(Continued)

(51) Int. Cl.
*C25C 7/00* (2006.01)
*C25C 7/02* (2006.01)
(Continued)

(52) U.S. Cl.
CPC .......... *C25C 7/02* (2013.01); *B29C 45/14409* (2013.01); *C25C 1/12* (2013.01);
(Continued)

(58) Field of Classification Search
CPC .... C25C 1/12; C25C 7/00; C25C 7/02–7/025; C25C 17/00; C25C 17/06; C25B 9/02
(Continued)

(56) References Cited

U.S. PATENT DOCUMENTS

| 1,470,883 A | 10/1923 | Schuh |
| 4,207,147 A | 6/1980 | Babin |

(Continued)

FOREIGN PATENT DOCUMENTS

| EP | 0202018 | 11/1986 |
| JP | 63033590 | 2/1988 |

(Continued)

OTHER PUBLICATIONS

Marley Plastics, "Cathode Edge-Strip System the market leader," Nov. 5, 2001, www.marley.com.au/products/mining.asp.

(Continued)

*Primary Examiner* — Luan V Van
*Assistant Examiner* — Alexander W Keeling
(74) *Attorney, Agent, or Firm* — Briggs and Morgan, P.A.; Gerald E. Helget

(57) ABSTRACT

A method of manufacturing an edge protector for a cathode plate includes inserting a first retention plate into a slit in a first edge strip, proximate an end of the first edge strip. The first retention plate is also inserted into a slit in a second edge strip, proximate a first end of the second edge strip. Additionally, the first retention plate is inserted into a gap of a first plug, such that the first plug abuts both the end of the first edge strip and the first end of the second edge strip. A corner cap is then overmolded on the end of the first edge strip, the first plug, and the first end of the second edge strip.

2 Claims, 11 Drawing Sheets

Related U.S. Application Data

(60) Provisional application No. 61/612,084, filed on Mar. 16, 2012.

(51) Int. Cl.
  *B29C 45/14* (2006.01)
  *C25C 1/12* (2006.01)
  *B29L 12/00* (2006.01)
  *B29L 31/34* (2006.01)
  *B29K 101/12* (2006.01)

(52) U.S. Cl.
  CPC ............ *C25C 7/00* (2013.01); *B29K 2101/12* (2013.01); *B29L 2012/00* (2013.01); *B29L 2031/3481* (2013.01)

(58) Field of Classification Search
  USPC ......... 204/279, 286.1–288.6, 297.01–297.16
  See application file for complete search history.

(56) References Cited

U.S. PATENT DOCUMENTS

| | | |
|---|---|---|
| 4,406,769 A | 9/1983 | Berger |
| 4,670,124 A | 6/1987 | Bartsch et al. |
| 4,776,928 A | 10/1988 | Perlich |
| 5,368,714 A | 11/1994 | Tanaka et al. |
| 5,470,450 A | 11/1995 | Tanaka et al. |
| 5,549,801 A | 8/1996 | Perlich et al. |
| 5,690,798 A | 11/1997 | Alexander et al. |
| 5,785,827 A | 7/1998 | Dougherty |
| 5,928,482 A | 7/1999 | Marttila |
| 6,017,429 A | 1/2000 | Persson |
| 6,193,862 B1 * | 2/2001 | Cutmore et al. ............... 204/281 |
| 6,231,730 B1 | 5/2001 | Davis et al. |
| 6,264,808 B1 | 7/2001 | Marttila |
| 6,274,012 B1 | 8/2001 | Santoyo |
| 6,312,573 B1 | 11/2001 | Dwyer et al. |
| 6,551,475 B2 | 4/2003 | Dwyer et al. |
| 6,702,933 B2 | 3/2004 | Alexander |
| 6,746,581 B2 | 6/2004 | Ebert |
| 6,951,600 B2 | 10/2005 | Santoyo |
| 7,033,465 B1 * | 4/2006 | Patton ................. C23C 18/1605 204/212 |
| 2004/0074766 A1 * | 4/2004 | Ebert ........................ C25C 7/02 204/279 |
| 2007/0051621 A1 * | 3/2007 | Webb ........................ C25C 7/02 204/288 |
| 2014/0116876 A1 | 5/2014 | Ringhand |

FOREIGN PATENT DOCUMENTS

| | | | |
|---|---|---|---|
| WO | | 9741280 | 11/1997 |
| WO | WO 2008087370 A2 * | 7/2008 | ........... B65D 81/053 |

OTHER PUBLICATIONS

Wernick, "Devices for Controlling the Distribution of Electrodeposits," Electrodepositors' Technical Society, 1943-44, pp. 35-48, vol. XIX, London, England.

* cited by examiner

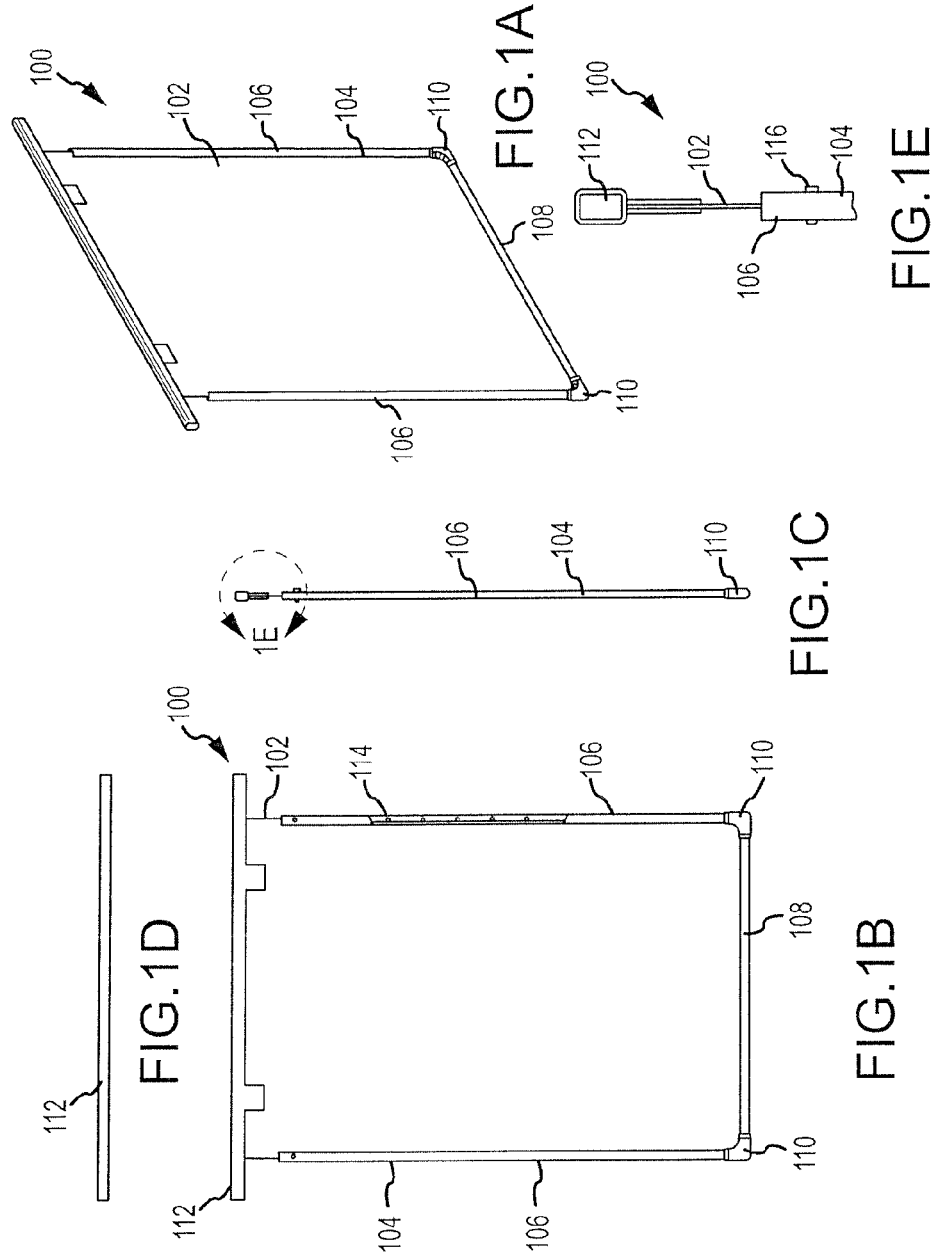

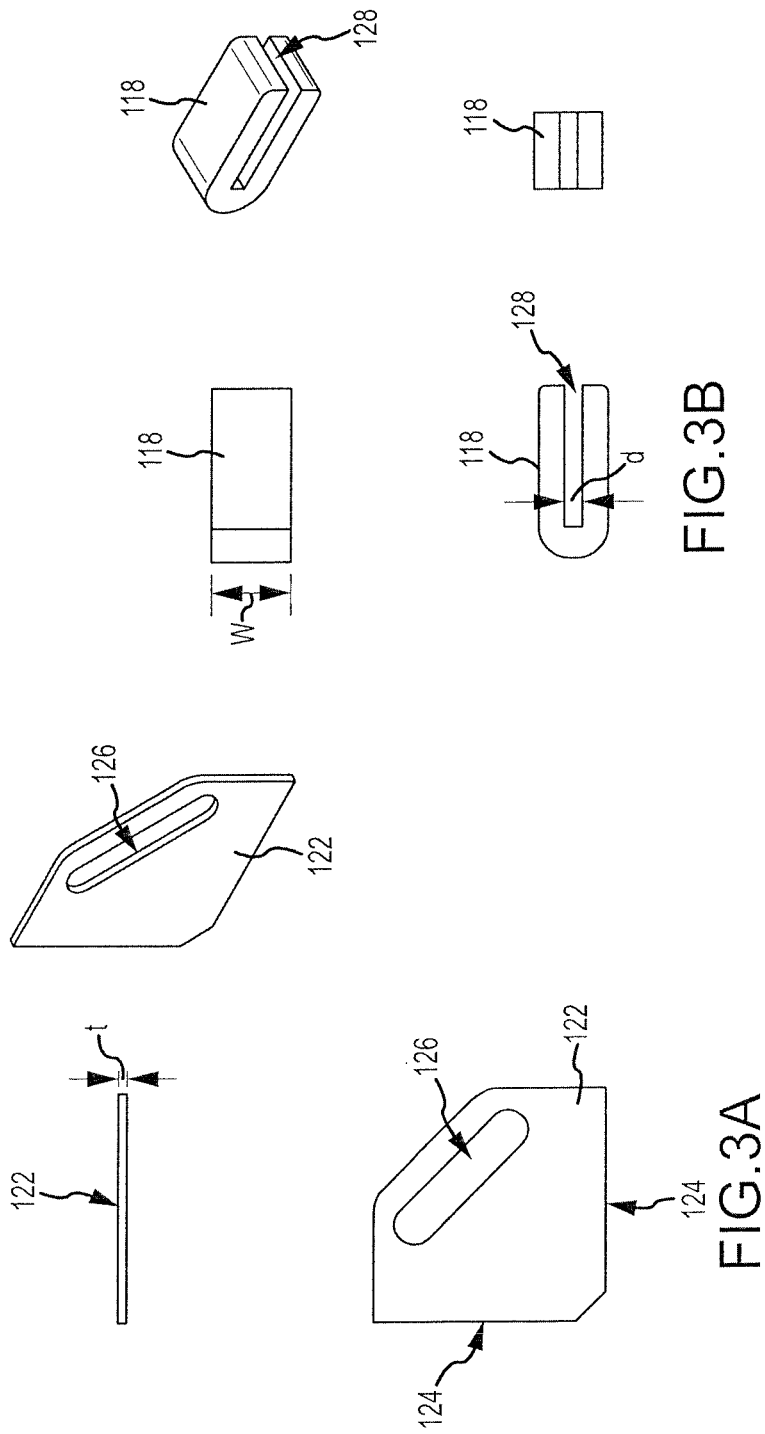

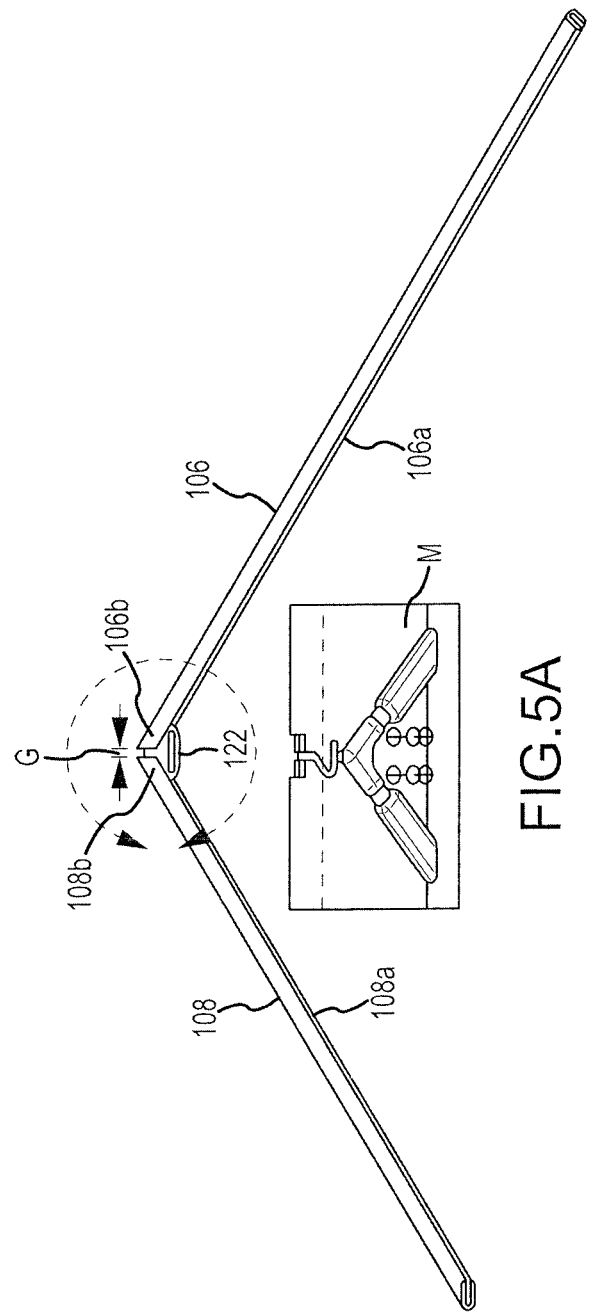

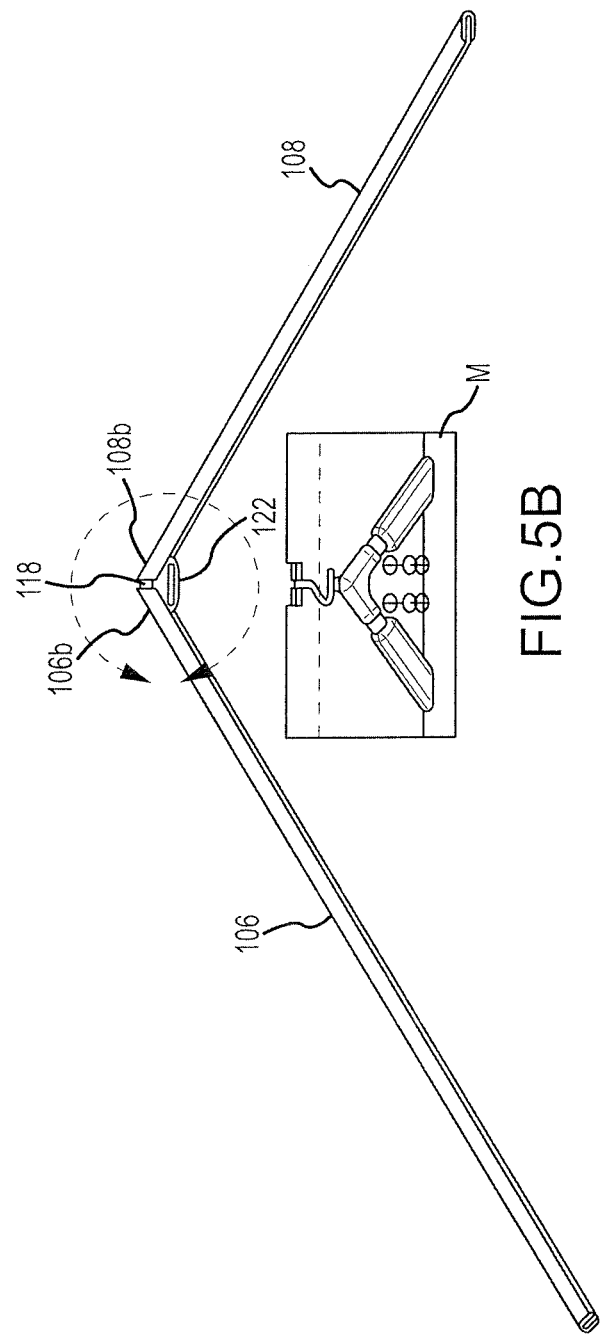

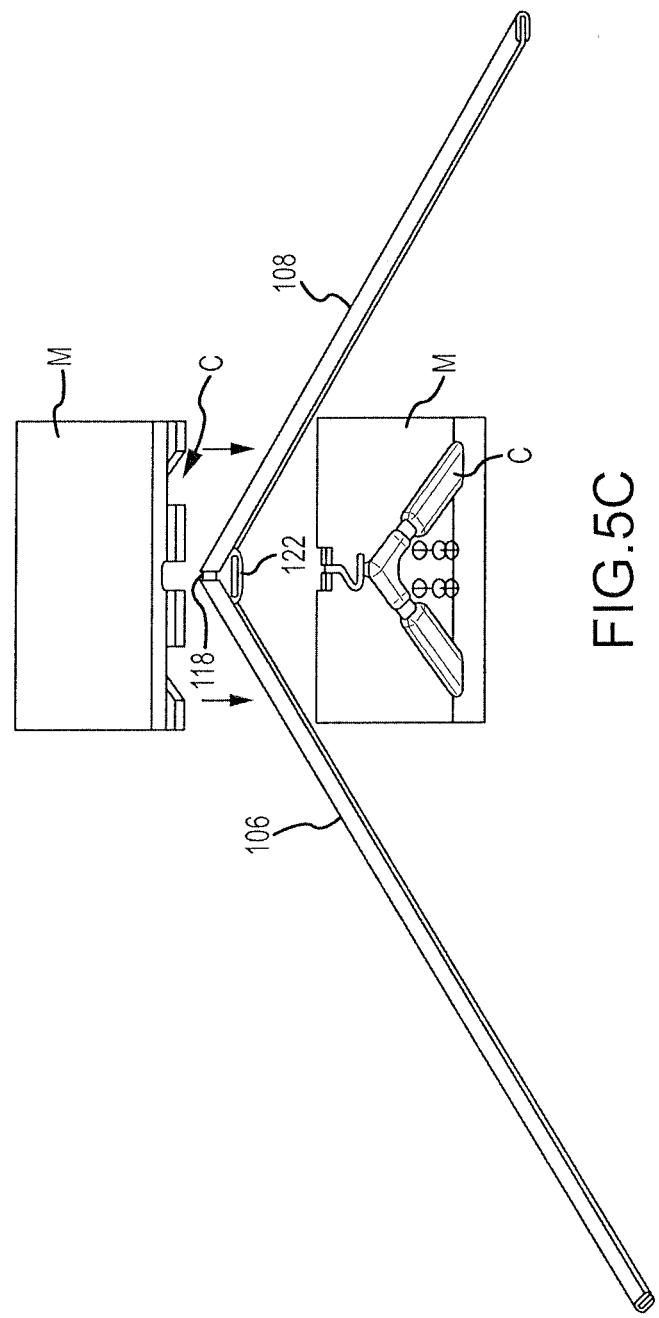

CATHODE PLATE EDGE PROTECTOR AND METHODS OF MANUFACTURE

CROSS-REFERENCE TO RELATED APPLICATIONS

This application is a Continuation-in Part and claims priority to and the benefit of U.S. utility patent application Ser. No. 13/838,907, entitled, "Cathode Plate Edge Protector and Methods of Manufacture," now issued U.S. Pat. No. 9,139,922, which claims priority to and the benefit of U.S. Provisional Patent Application Ser. No. 61/612,084, filed Mar. 16, 2012, entitled, "Cathode Plate Edge Protector and Methods of Manufacture," the disclosures of which are hereby incorporated by reference herein in its entirety.

INTRODUCTION

Cathode plates are used in electrowinning processes to remove heavy metals from concentrated solutions, for example, during certain processes for making copper sheets. A copper-bearing solution is mixed with an acid such as sulfuric acid, thus forming an electrolyte solution. This electrolyte solution is placed in a tank where alternating rows of stainless steel cathode plates and lead anode plates are suspended vertically. Electrical buss lines connected to the cathode and anode plates are connected to a DC source having a high current and a low voltage. This causes the copper in the solution to be deposited in layers on the cathode plates. Typically, copper deposits more heavily on the edges of the cathode plates, which can lead to problems moving the plates from the tanks, or removing the copper sheets from the steel plates after processing. For this reason, plastic (or otherwise non-conductive) edge protectors are placed on the edges of the cathode plates located below the surface of the solution. The edge protectors prevent excessive copper buildup at the plate edges. The technology associated with these edge protectors is constantly improving.

SUMMARY

In one aspect, the technology relates to a method of manufacturing an edge protector for a cathode plate, the method including: inserting a first retention plate into a slit in a first edge strip, proximate an end of the first edge strip; inserting the first retention plate into a slit in a second edge strip, proximate a first end of the second edge strip; inserting the first retention plate into a gap of a first plug, such that the first plug abuts both the end of the first edge strip and the first end of the second edge strip; and overmolding a first corner cap on the end of the first edge strip, the first plug, and the first end of the second edge strip.

In another aspect, the technology relates to an edge protector for a cathode plate, the edge protector including: a first edge strip having a beveled end and an elongate slit; a second edge strip having a beveled end and an elongate slit; and a first plug abutting both of the beveled end of the first edge strip and the beveled end of the second edge strip.

In another aspect, the technology relates to an edge protector for a cathode plate, the edge protector including: a first edge strip having a beveled end and an elongate slit; a second edge strip having a beveled end and an elongate slit; and a corner cap covering the beveled end of the first edge strip and the beveled end of the second edge strip, wherein the beveled end of the first strip and the beveled end of the second strip define a gap therebetween.

In another aspect, the technology relates to an edge protector for a cathode plate, the edge protector including: a first edge strip having a squared end and an elongate slit; a second edge strip having a squared end and an elongate slit; and a first plug abutting both of the squared end of the first edge strip and the squared end of the second edge strip.

In another aspect, the technology relates to an edge protector for a cathode plate, the edge protector including: a first edge strip having a squared end and an elongate slit; a second edge strip having a squared end and an elongate slit; and a corner cap covering the squared end of the first edge strip and the squared end of the second edge strip, wherein the squared end of the first strip and the squared end of the second strip define a gap therebetween.

In another aspect, the technology relates to an edge protector for a cathode plate, wherein the elastomeric plug functions as a molding barrier to keep plastic out of the channels when overmolding the corner caps.

In another aspect, the technology relates to an edge protector for a cathode plate, wherein the elastomeric plug functions as strengthening component to allow more plastic into the corner overmold.

In another aspect, the technology relates to an edge protector for a cathode plate, wherein the elastomeric plug functions as a cushion for the cathode plate, particularly if the plate is dropped as to prevent the corner cap from shattering.

In another aspect, the technology relates to an edge protector for a cathode plate, wherein the elastomeric plug functions as a flexibility component rendering the corner cap more flexible.

BRIEF DESCRIPTION OF THE DRAWINGS

There are shown in the drawings, embodiments which are presently preferred, it being understood, however, that the technology is not limited to the precise arrangements and instrumentalities shown.

FIG. IF depicts an exploded perspective view of the cathode plate of FIG. 1A.

Figure 2A:
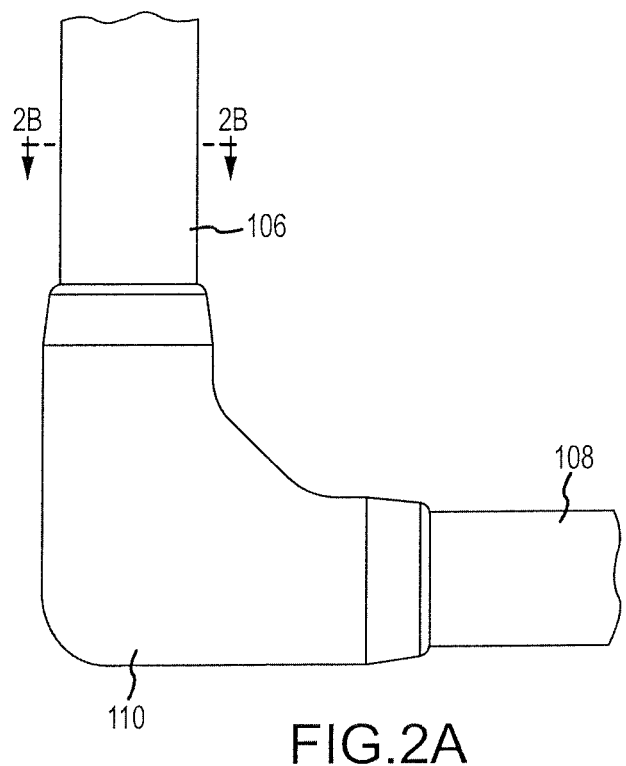

FIG. 2A is an enlarged view of a corner cap of a cathode plate edge protector.

Figure 2B:
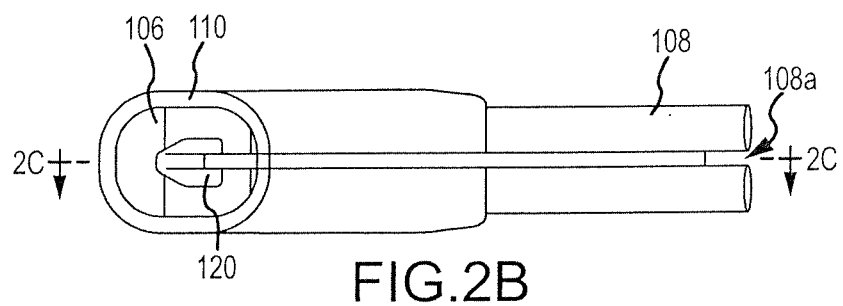

FIG. 2B is an enlarged end sectional view of the corner cap of FIG. 2A.

Figure 2C:
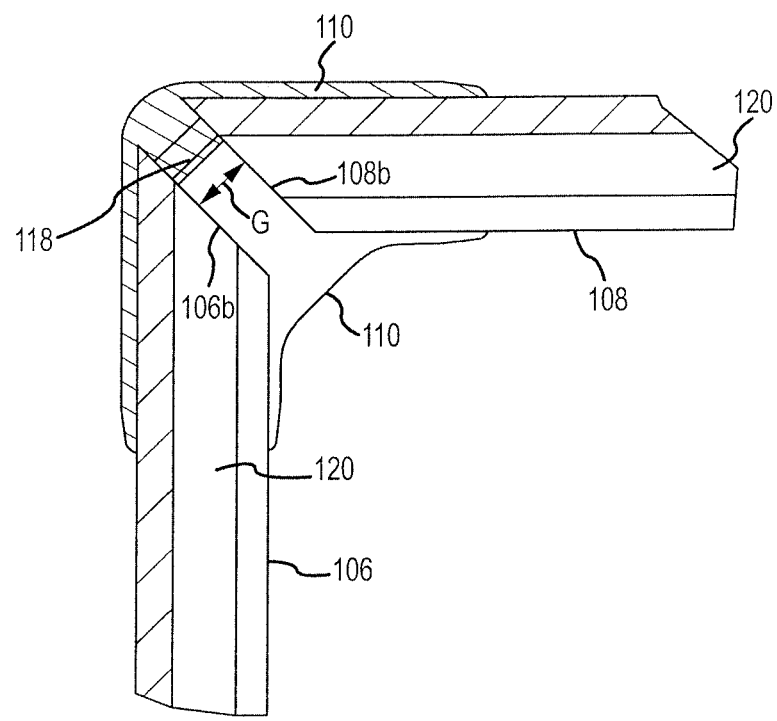

FIG. 2C an enlarged top sectional view of the corner cap of FIG. 2A.

FIG. 3A depicts various views of a retention plate.

FIG. 3B depicts various views of a corner plug.

Figure 4:
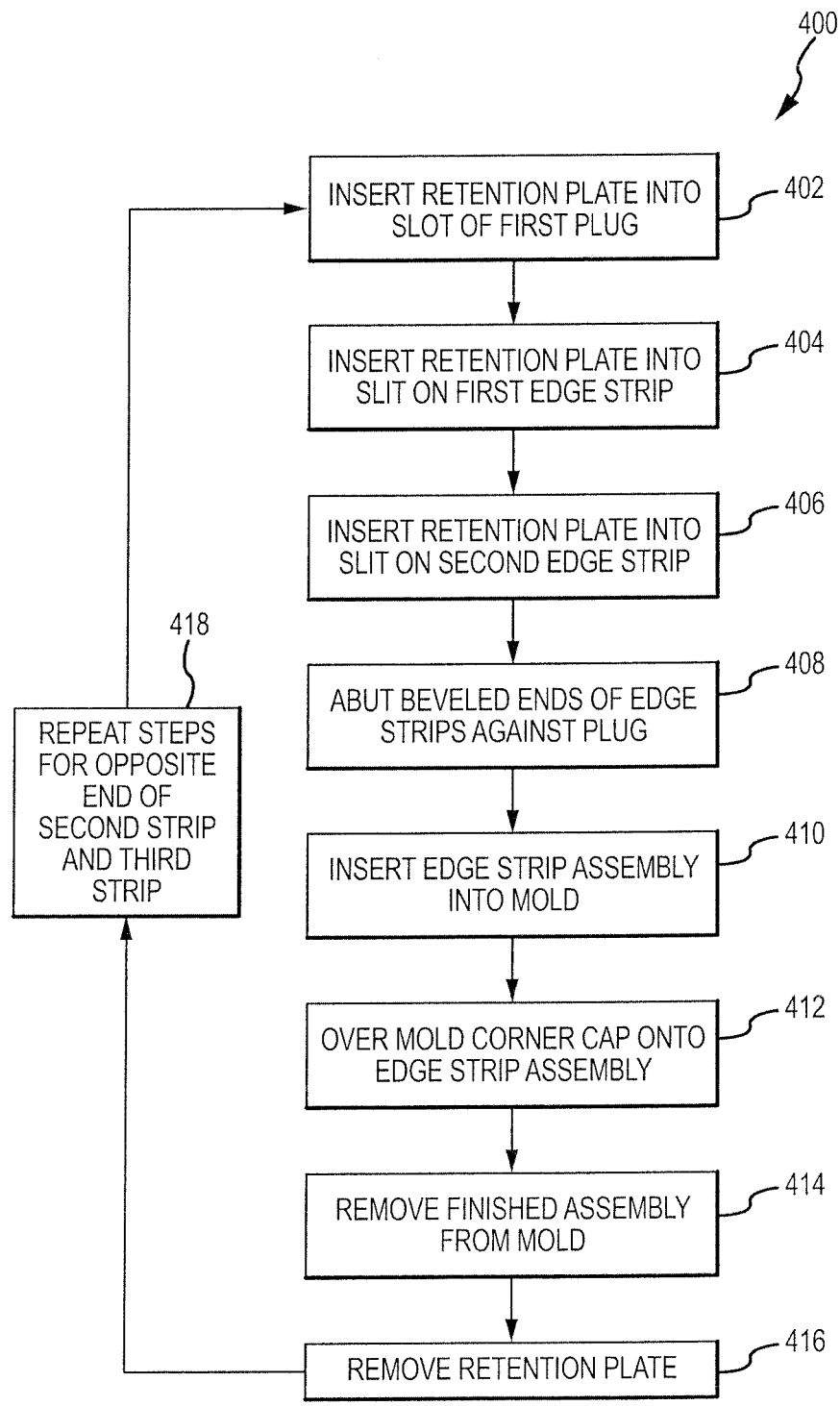

FIG. 4 depicts a method of manufacturing a cathode plate edge protector.

FIGS. 5A-5D depict the method of FIG. 4.

Figure 6:
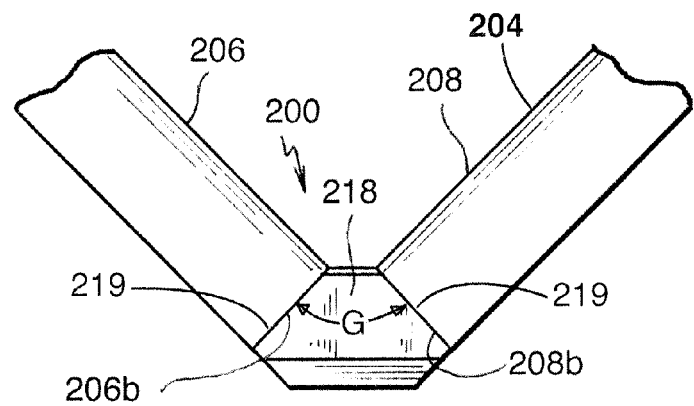

FIG. 6 depicts a top plan view of squared-end side and bottom edge protector strips with an orthogonal corner plug therebetween.

Figure 7:
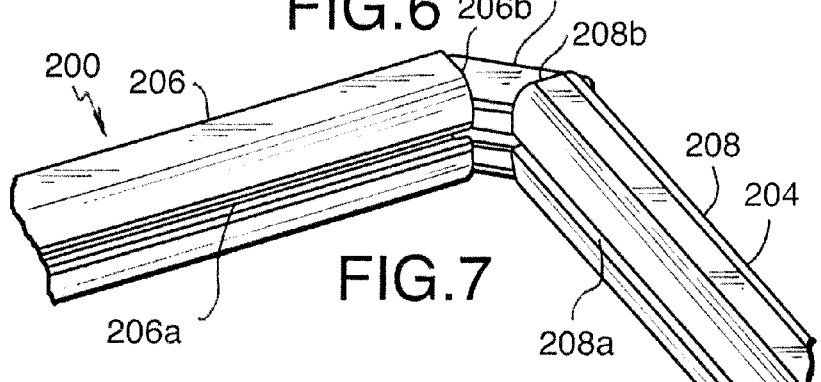

FIG. 7 depicts a perspective view of squared-end side and bottom edge protector strips with an orthogonal corner plug therebetween.

Figure 8:
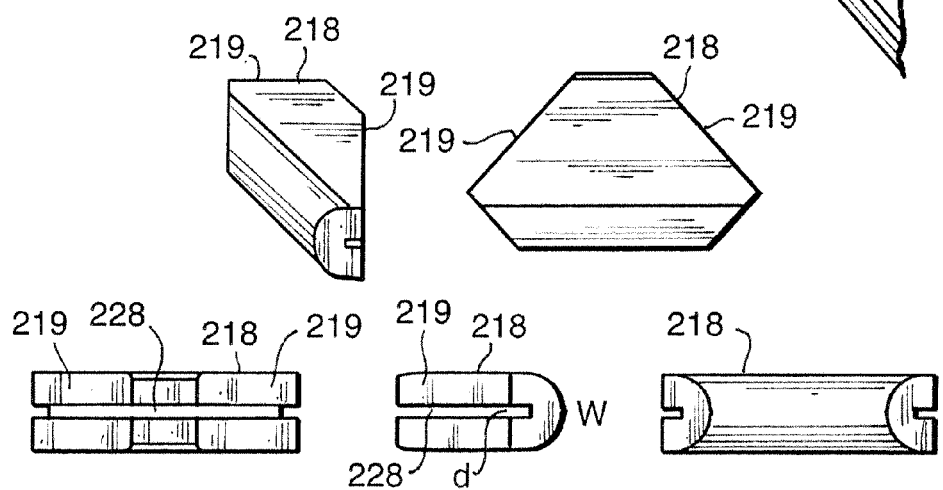

FIG. 8 depicts various views of a orthogonal corner plug.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

FIGS. 1A-1F depict various views of a cathode plate system 100 having a steel plate 102 and an edge protector 104. The edge protector 104 includes two side edge strips 106 and a bottom edge strip 108. The side edge strips 106 and bottom edge strip 108 are joined at two overmolded corner caps 110. The edge strips 106, 108 and corner caps 110 are described in more detail below. The cathode plate 100 also includes a hanger 112 that is used to support the cathode plate 100 during transport and the electrowinning process. Buss lines (not shown) are connected as required to the hanger 112. Inserts 114 are located underneath the side edge strips 106 and hold the side edge strips 106 in place. Additionally, a top end of the side edge strips 106 may be held in place by one or more pins, screws, bolts, or other connectors 116.

Figure 1F:
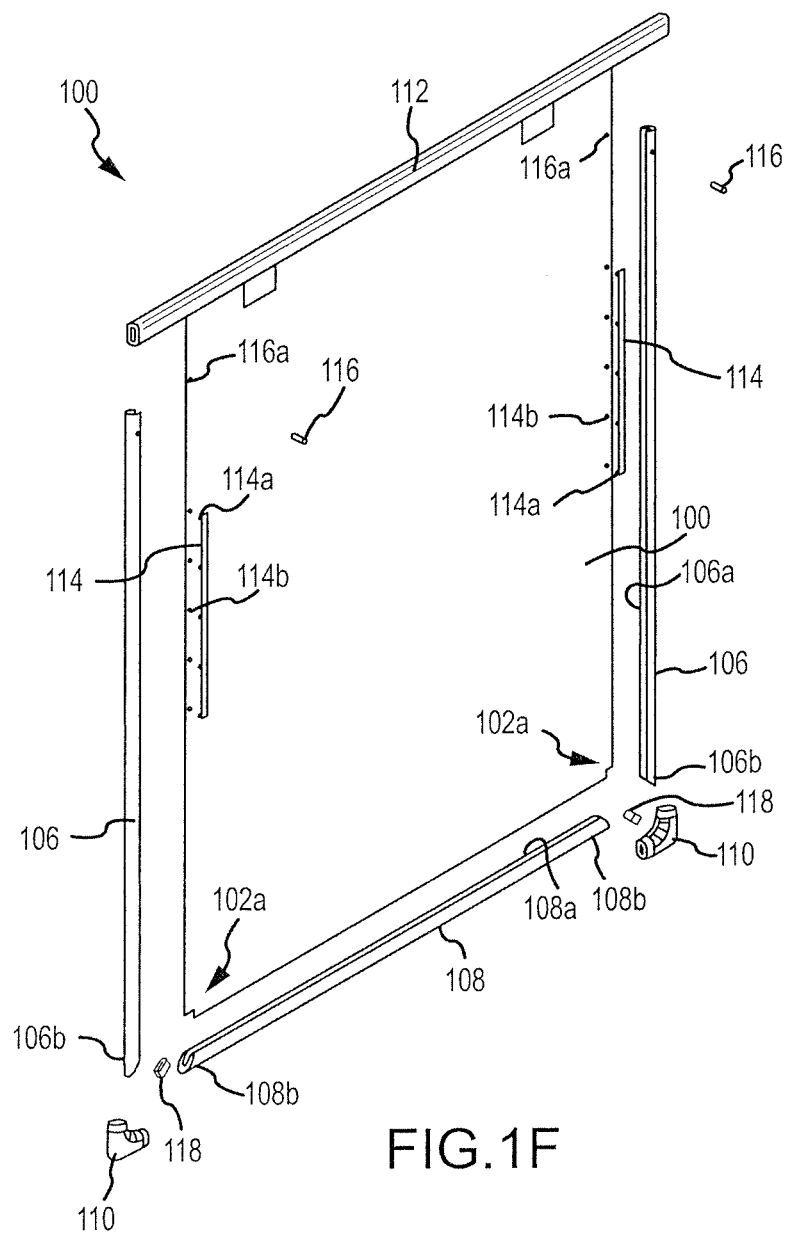
FIGS. 1A-1D depict perspective, front, side, and top views, respectively, of a cathode plate having an edge protector.
FIG. 1E depicts an enlarged partial side view of the cathode plate of FIG. 1A.

FIG. 1F depicts an exploded view of the cathode plate 100, including additional elements not visible in the previous figures. For example, the pins 116 are passed through pin openings 116a in the steel plate 102. The inserts 114 also include a number of integral insert pins 114a that fit within insert pin openings 114b in the steel plate 102. Each of the side edge strips 106 and bottom edge strip 108 include an elongate slit 106a, 108a, respectively, that receive the corresponding edges of the steel plate 102. The bottom edge strip 108 includes two beveled ends 108b. Each of the two side edge strips 106 include a single beveled end 106b, proximate the beveled ends 108b of the bottom edge strip 108. A plug 118 is located between the beveled ends 106b, 108b, abutting both elements, as described in more detail below. While the ends 106b, 108b of the elements are depicted as beveled, in other embodiments, the ends may be cut perpendicular to the axis of each edge strip. The plug may be configured accordingly so as to accommodate this configuration and abut the square ends of the edge strips. Additionally, the bottom corners 102a of the steel plate 102 may be squared, chamfered, curved, or otherwise shaped to ease insertion of the finished edge protector 104 onto the steel plate 102.

FIGS. 2A-2C depict various enlarged views of the corner cap 110. The cap 110 is overmolded onto the beveled ends of the side edge strip 106 and bottom edge strip 108, as described in more detail below. In the depicted embodiment, the side edge strip 106 and bottom edge strip 108 each comprise substantially C-shaped elements. The open portion of the C-shape defines the elongate slit 106a, 108a of each strip. The side edge strip 106 (as well as the bottom edge strip 108) each define a void 120 that provides additional space around the edges of the plate 102. This void may be absent in other embodiments, and all interior surfaces of the edge strips 106, 108 may be tight to the steel plate 102 when installed. The edge strips, which may be extruded plastic profiles, may also take any other shapes, as required or desired. For example, round, square, or other profile shapes are contemplated, as required or desired for a particular application.

FIG. 2C is a top sectional view of the corner cap 110. As described herein, the cap 110 is overmolded onto the beveled ends 106b, 108b of the edge strips 106, 108. The plug 118 is located between the two beveled ends 106b, 108b, and abuts both elements. In that regard, the plug 118 defines a gap G between the beveled ends 106b, 108b, which do not touch each other. The overmolding may extend virtually any distance from the plug 118 along the strips 106, 108, although distances of about 2.75 inches (on strips having a length of about 42 inches to about 51 inches) may be desirable. In general, the overmolded cap 110 need only cover a sufficient portion of the beveled ends 106b, 108b so to form a robust connection.

FIG. 3A depicts a molding retention plate 122, used in the manufacture of the edge protector 104 described herein, as well as to reinforce the overmolded corner cap 110. The molding retention plate 122 includes two substantially orthogonal rear edges 124 and is of a thickness t to fit within the elongate slits 106a, 108a within the side edge strip 106 and bottom edge strip 108. The rear edges 124 are substantially orthogonal to form a square joint for the edge strips 106, 108. The plate 122 may define an opening 126 or other element to aid in removing the plate 122 from the overmolded corner cap 110. FIG. 3B depicts various views of the plug 118. A width w of the plug 118 defines the gap G when the edge strips 106, 108 abut the plug 118. The plug 118 also defines a slot 128 for receiving the molding retention plate 122 during the overmolding process, described below. In general, the depth d of the slot 128 is a close fit with the thickness t of the molding retention plate 122, to ensure the connection is maintained during the manufacturing process. Also, the retention plate 122 helps ensure alignment of the elongate slits 106a, 108a, with the slot 128 of the plug 118. In certain embodiments, the retention plate and the plug may be manufactured as a unitary part, with the retention plate having an enlarged portion against which the beveled ends of the first and second edge strips abut during manufacture.

FIG. 4 depicts a method of manufacturing 400 an edge protector. The method 400 includes inserting a retention plate 122 into a slot of a plug 118 (Step 402). The retention plate 122 is then inserted into a slit 106a of a side edge strip 106, proximate the beveled end 106b thereof (Step 404). Next, the retention plate 122 is inserted into the slit 108a of a bottom edge strip 108, proximate the beveled end 108b thereof (Step 406). These second two steps are also depicted in FIG. 5A, which does not depict the plug 118. Since the manufacturing steps prior to overmolding may be performed in any order, FIG. 5A depicts the condition where a gap G is maintained between the two beveled ends 106b, 108b, so as to provide space for subsequent insertion of the plug 118. As depicted in FIG. 5B, the plug 118 is located in the gap G. Of course, the retention plate 122 may first be inserted into the bottom edge strip 108, then the side edge strip 106. Regardless of the order of insertion of the retainer plate 122 into the various elements, the beveled ends 106b, 108b are placed in abutting contact with the projection (Step 408). The abutting contact between the plug 118 and the beveled ends 106b, 108b helps ensure a square corner.

Figure 5D:
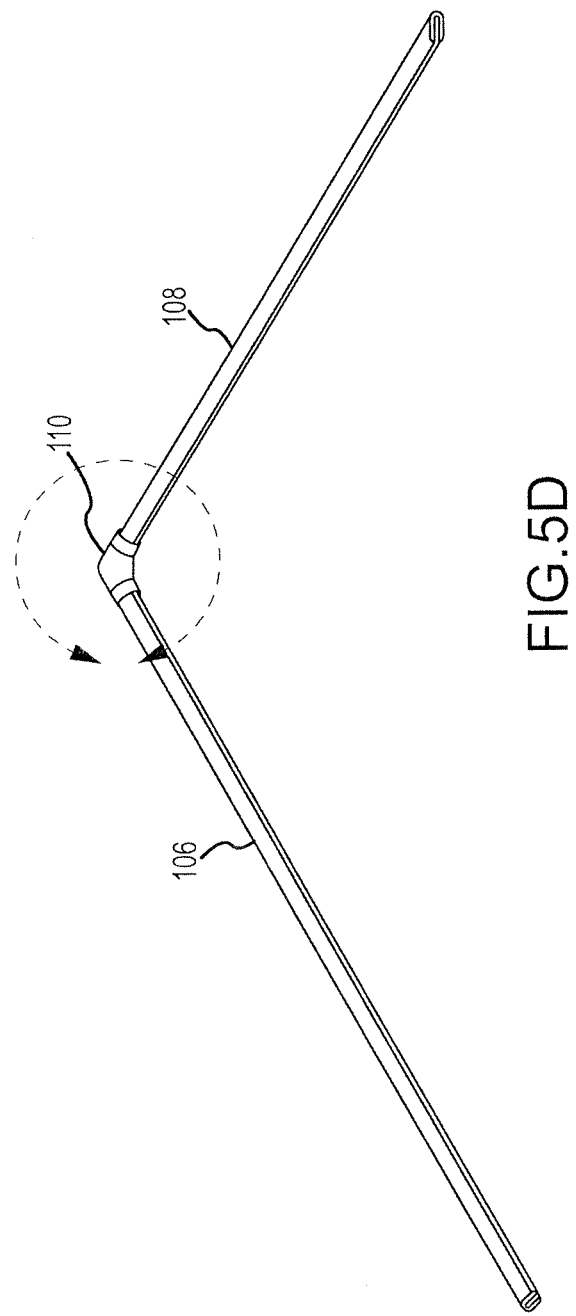

Thereafter, the edge strip assembly may be inserted into a mold M. FIG. 5C depicts a mold M covering the edge strip assembly. The mold M includes upper and lower plates that each define a number of channels C for receipt of the edge strip assembly. The edge strip assembly is placed in the mold M (Step 410), and molten plastic is injected into the mold M, so as to overmold a corner cap 110 on the assembly (Step 412). The plastic may be injected under both high and low pressure processes that are known in the art. Once the plastic has sufficiently cooled, the finished assembly is removed from the mold M (Step 414), and the retention plate 122 is removed (Step 416) to produce the finished edge strip assembly depicted in FIG. 5D. Thereafter, these steps are repeated (Step 418), for the opposite beveled end of the bottom edge strip 108 and the second side edge strip 106 (which may be referred to as the "third" edge strip). Of course, both overmolded caps 110 may be formed at the same time, in multiple molds or a single mold. The finished edge protector may then be inserted onto the edges of a steel plate.

The edge strips 106, 108 may be manufactured of extruded rubber, plastic, or other non-conductive material. Additionally, it is advantageous if the edge protector described herein is manufactured of heat-resistant material, since the edge protectors are often cleaned by exposure to high heat fluids. Exemplary materials for both the bottom and side edge strips may include ABS, polypropylene, HDPE, LDPE, PVC, CPVC, thermoplastics, composite polymers, etc. In other embodiments, the bottom edge strip may be manufactured of CPVC and the side edge strips may be manufactured of PVC.

The plug may be manufactured of robust non-conductive plastics, as may the retention plate. The plug could also be made of silicone. Additionally, the retention plate may be manufactured of metal such as steel, stainless steel, or titanium, such that the plate may be re-used over a long period of time. The plastics used in the overmolding process may include ABS, polypropylene, HDPE, LDPE, PVC, CPVC, thermoplastics, composite polymers, etc. Other types and combinations of materials for the various components are contemplated.

FIGS. 6 and 7 depict various views of another embodiment of cathode plate system 200 having an edge protector 204. The edge protector 204 includes two side edge strips 206 (only one shown) and a bottom edge strip 208. The side edge strips 206 and bottom edge strip 208 are joined at two overmolded corner caps 110 as similarly described above with regard to edge protector 104.

Each of the side edge strips 206 and bottom edge strip 208 include an elongate slit 206a, 208a, respectively, that receive the corresponding edges of the steel plate 102. The bottom edge strip 208 includes two squared ends 208b. Each of the two side edge strips 206 include a single squared end 206b, proximate the squared ends 208b of the bottom edge strip 208. A plug 218 is located between the squared ends 206b, 208b, abutting both elements, as similarly described in more detail above.

FIG. 8 depicts various views of the orthogonal plug 218. A width of the plug 218 defines the gap G when the edge strips 206, 208 abut the plug 218. The gap G for plug 218 is wider than gap G for plug 118. This arrangement makes for an even stronger corner cap 110 allow for more plastic to fill the mold.

The orthogonal sides 219 of plug 218 touch the squared ends 206b and 208b to maintain a square corner with side and bottom edge strips 206 and 208 during the overmolding process. The plug 218 also defines a slot 228 for receiving the molding retention plate 122 during the overmolding process, described above. In general, the depth d of the slot 228 is a close fit with the thickness t of the molding retention plate 122, to ensure the connection is maintained during the manufacturing process. Also, the retention plate 122 helps ensure alignment of the elongate slits 206a, 208a, with the slot 228 of the plug 218.

The method of manufacture for edge protector 204 is the same as the method of manufacture of edge protector 104 described above and shown in FIGS. 4 through 5D.

While there have been described herein what are to be considered exemplary and preferred embodiments of the present technology, other modifications of the technology will become apparent to those skilled in the art from the teachings herein. The particular methods of manufacture and geometries disclosed herein are exemplary in nature and are not to be considered limiting. It is therefore desired to be secured in the appended claims all such modifications as fall within the spirit and scope of the technology. Accordingly, what is desired to be secured by Letters Patent is the technology as defined and differentiated in the following claims, and all equivalents.

What is claimed is:

1. An edge protector for cathode plate edges, the edge protector comprising:
    a first one-piece edge strip of extruded plastic having a squared end and an elongate slit;
    a second one-piece edge strip of extruded plastic having a squared end and an elongate slit;
    a bottom one-piece edge strip of extruded plastic having squared ends and an elongate slit;
    two elastomeric orthogonal plugs each with an approximate width and a slot alignable with the slits, each plug touching one of the squared ends of the first and second edge strips and one of the squared ends of the bottom edge strip forming a molding barrier between the edge strips defining a gap between the touched squared ends forming a cushion for the cathode plate edges wherein the approximate width of the plugs define the gap; and
    overmolded corner caps of a polymer plastic covering the entirety of and extending over and beyond the squared ends of the first and second edge strips, the squared ends of the bottom edge strip, the plugs and the gaps, extending inwardly toward both sides of the slits and slots but not covering the slits and the slots, so as to form a robust, strong, flexible connection and to prevent excessive copper buildup at the plate edges thereby forming a unitary edge protector structure.

2. The edge protector for cathode plate edges wherein the plugs are made of silicone.

* * * * *